United States Patent
Audier et al.

[19]

[11] Patent Number: 5,812,190
[45] Date of Patent: Sep. 22, 1998

[54] DETECTION METHOD USING DISTRIBUTED READ AND INTEGRATION CYCLES FOR SCANNING CAMERA AND CORRESPONDING DETECTION ARRAY

[75] Inventors: Marcel Audier, Paris; Christian Pepin; Véronique Besnard, both of Gif s/Yvette, all of France

[73] Assignee: Thomson-CSF, Paris, France

[21] Appl. No.: 622,609

[22] Filed: Mar. 26, 1996

[30]     Foreign Application Priority Data

Apr. 11, 1995 [FR] France .................................. 95 04338

[51] Int. Cl.⁶ ...................................... H04N 3/14
[52] U.S. Cl. ......................................... 348/295; 250/208.1
[58] Field of Search .................... 348/294, 295, 348/311; 250/208.1; 257/234

[56]     References Cited

U.S. PATENT DOCUMENTS

| | | |
|---|---|---|
| 4,191,967 | 3/1980 | Dansac et al. . |
| 4,327,377 | 4/1982 | Takken ..................... 348/295 |
| 4,363,034 | 12/1982 | Grancoin et al. . |
| 4,380,028 | 4/1983 | Pepin et al. . |
| 4,404,592 | 9/1983 | Pepin et al. . |
| 5,054,917 | 10/1991 | Pepin et al. . |
| 5,071,226 | 12/1991 | Audion et al. . |
| 5,102,065 | 4/1992 | Couderc et al. . |
| 5,268,822 | 12/1993 | Delalande et al. . |
| 5,296,705 | 3/1994 | Pepin et al. . |
| 5,327,234 | 7/1994 | Creswick ................................. 348/295 |
| 5,402,168 | 3/1995 | Fouilloy .................................. 348/295 |

*Primary Examiner*—Wendy Garber
*Attorney, Agent, or Firm*—Oblon, Spivak, McClelland, Maier & Neustadt, P.C.

[57]     ABSTRACT

Disclosed is a detection method and a corresponding array architecture comprising sensors positioned according to a particular geometry, enabling the integration of a circuit for the management of the integration cycles and of transfers of charges between injection-integration circuits and TDI type summation circuits in the focal plane of the array. The array is fitted into a scanning camera that scans in a particular direction. The camera is designed to form a video signal for an image made up of pixels spaced out at a pitch $p_p$ with a value corresponding to the standard. The array has several rows of elementary sensors. The the sensors that belong to different rows and are aligned in the scanning direction define a detection channel $V_k$. The spatial pitch $p_c$ of one and the same detection channel has a value that differs from the value of the pixel pitch $p_p$ by a fraction of this pixel pitch such that a sensor-pixel coincidence, which is achieved for a reference sensor $C_0$, is no longer synchronous for any other sensor exposed to the same elementary field of view.

16 Claims, 4 Drawing Sheets

DETECTION METHOD USING DISTRIBUTED READ AND INTEGRATION CYCLES FOR SCANNING CAMERA AND CORRESPONDING DETECTION ARRAY

BACKGROUND OF THE INVENTION

The invention relates to scan imaging and especially to the detection of images using a set of elementary sensors associated with an image scanning system. The invention can be applied especially to infrared cameras, "visible" cameras using sensors that are photosensitive in the spectral band of visible and near-infrared radiation, and to watch devices with rotating arrays.

In order to obtain sufficient detection sensitivity, detectors have the form of an array comprising at least one row of elementary sensors positioned in a so-called focal plane of the array, in a main direction that is orthogonal to the direction of the scanning. The scanning is done by an adapted opto-mechanical system comprising especially a mobile mirror and an optical assembly for the forming and projection of an image of the observed scene on the detection array.

Each sensor then analyzes an elementary field of an angle of view corresponding to the geometrical characteristics of the sensor and its structural environment during a given elementary period of exposure, as a function of the scanning characteristics. During the scanning of a scene, the field of view observed is then split up into a series of elementary fields, each series of elementary fields being defined and analyzed by a detection channel comprising at least one elementary sensor. In the case of horizontal scanning, the number of detection channels is then equal to the number of lines described on the image of a scene projected by the opto-mechanical system.

On each detection channel, the charges generated by each elementary sensor as a function of the illumination that it receives are stored and then multiplexed to form a video signal. The number of lines thus analyzed corresponds either to the number of lines per frame of the video standard used at output of the camera when the scanning is of a horizontal type or to the line resolution when the scanning is of a vertical type.

In order to increase the sensitivity of detection of each channel, the opto-mechanical scanning operation, known as parallel scanning, is generally coupled with a summator scanning operation, called a series scanning operation. Such a method is known as time delay integration or TDI. It is described for example in the article by R. J. Martin et al., Time Division Multiplexed Time Delay Integration, in S.P.I.E., Vol. 930 (1988), pp 26 to 43.

Series scanning is obtained by the use, for each detection channel, of several elementary sensors positioned in the scanning direction and spaced out at an integral multiple of the pitch of the "pixels" (this term is hereinafter used to mean elementary image dots or picture elements) laid down by the television standard used. One and the same elementary field is therefore successively analyzed by each of the sensors of one and the same detection channel, the outputs of the sensors supplying a TDI processing module associated with each detection channel. The charges generated by the sensors are thus injected and integrated into adapted integration and injection circuits in order to be delayed, and are then summated. The operating cycles of the circuits, managed by a sequencer, are identical for all the sensors. This dictates a synchronous reading of the integration circuits, either by the use of a bus with as many tracks as there are sensors per detection channel or a single track bus associated with a buffer memory.

At the end of the integration, the reading is done either in terms of charges, by a CCD (charge-coupled device) type of shift register of summators, or in terms of voltage, by means of a summation register using CMOS technology. A technology of this kind is known for example from the article by I. M. Baker et al., IEEE Conference Publication No. 321 (1990). In order to enable the processing of all the information elements on luminance generated by the elementary sensors, each summation register associated with each detection channel comprises as many cells as there are information elements being prepared.

One of the main problems raised by this type of architecture is caused by the amount of space that it requires. This space requirement prevents the integration of the summation registers into the focal plane of the detection array. The registers are therefore mounted in another plane with or without the associated injection circuit. The problem is then transferred to that of the amount of space required for the connections.

When the assembly formed by the injection/integration circuits and the summation registers is positioned away, the space required by the connections between the sensors and the injection circuits limits the number of sensors per detection channel and hence the sensitivity of detection.

When only the summation circuits are positioned away, the number of sensors per detection channel may be increased by using a single connection (a single track bus) to carry out the transfer of information between the injection circuits and the summators of the summation registers.

However, an architecture of this type also requires the positioning of a storage circuit integrated into the injection circuits, made for example by means of a sample-and-hold device, in order to prevent any temporal coincidence between the operations of reading information in the injection circuits during the integration cycle. A uniform distribution of the reading instants is thus obtained. However the presence of this memory substantially reduces the useful surface and hence the integration capacities of the circuit and creates an additional risk of deterioration of the information (parasitic couplings, leakage currents, etc.). This loss of active surface area can be recovered at the cost of an increase of the sensor pitch, giving rise to an increase in the size of the detector and hence a decrease in scanning efficiency.

The invention is aimed specifically at overcoming these defects by proposing a method of detection and a corresponding array architecture enabling the integration of the TDI summation registers into the focal plane of the array. Another aim of the invention is to achieve compatibility between different modes of use of a scanning camera defined on the basis of variable parameters of its scanning, enabling partial scanning or matching with different television standards.

To achieve these goals, the geometry of the matrix of the sensors of the detection array is configured according to a particular type of architecture enabling the integration of a circuit for the management of the integration cycles and transfers of data elements between the injection/integration circuits and the summation circuits, this architecture being furthermore compatible with the passage from one mode of operation, defined by a given sub-scanning and a given standard, to another.

SUMMARY OF THE INVENTION

More specifically, an object of the invention is a method of detection with distributed integration and read cycles for a camera that scans in a given direction designed to form an image made up of pixels spaced out at a pitch with a value corresponding to a predetermined standard, said camera comprising an array of several rows of elementary sensors positioned in a direction orthogonal to the scanning direction, the sensors that belong to different rows and are aligned in the scanning direction defining a TDI detection channel, each detection channel comprising a circuit for the injection and integration of the charges delivered by each sensor during a period of exposure to form a sampling signal, and a summator read register to totalize the sampling signals corresponding to one and the same pixel, said method consisting of the choosing of a value of spatial pitch for the sensors of one and the same detection channel that differs from the value of the pixel pitch by a fraction of this pixel pitch such that a sensor-pixel coincidence, which is achieved for a reference sensor ($C_0$), is no longer synchronous for any other sensor exposed to the same elementary field of view and consisting of the recording, in each summator, between two successive readings of each sensor, of the information coming from the associated integrated circuit.

According to a particular characteristic of the method, the choice of the spatial pitch of the sensors of one and the same detection channel, which gives a value of a ratio of geometrical asynchronism in the direction of scanning between this pitch and that of the pixels of a given standard, induces an order of reading of the integration circuits of one and the same detection channel, this order being predetermined as a function of the values of magnification and of pixel pitch defined on the basis of the mode of operation considered, as a function of a given sub-scanning and standard.

The invention also relates to a detection array comprising a logic management circuit to activate transfers of information among the injection, integration and summation circuits, made by means of CMOS technology or combined CMOS-CCD technology compatible with the technology used for the logic management circuit.

The invention can be used to simplify the injection and integration circuits by removing the need for a buffer memory such as a sample-and-hold device and reduce the pitch between sensors in the scanning direction which may be chosen to be the minimum permitted by the technologies used, in order to make the photodetection sensors and the hybridization circuits between the injection/integration and read circuits. Thus the total dimensions are reduced.

The invention also enables an increase in scanning efficiency owing to the reduction of the height of the detection array as compared with the height of the optical image projected on the array.

BRIEF DESCRIPTION OF THE DRAWINGS

Other features and advantages shall appear from the following description of an embodiment accompanied by the appended figures, of which respectively.

DETAILED DESCRIPTION OF THE INVENTION

Figure 1:
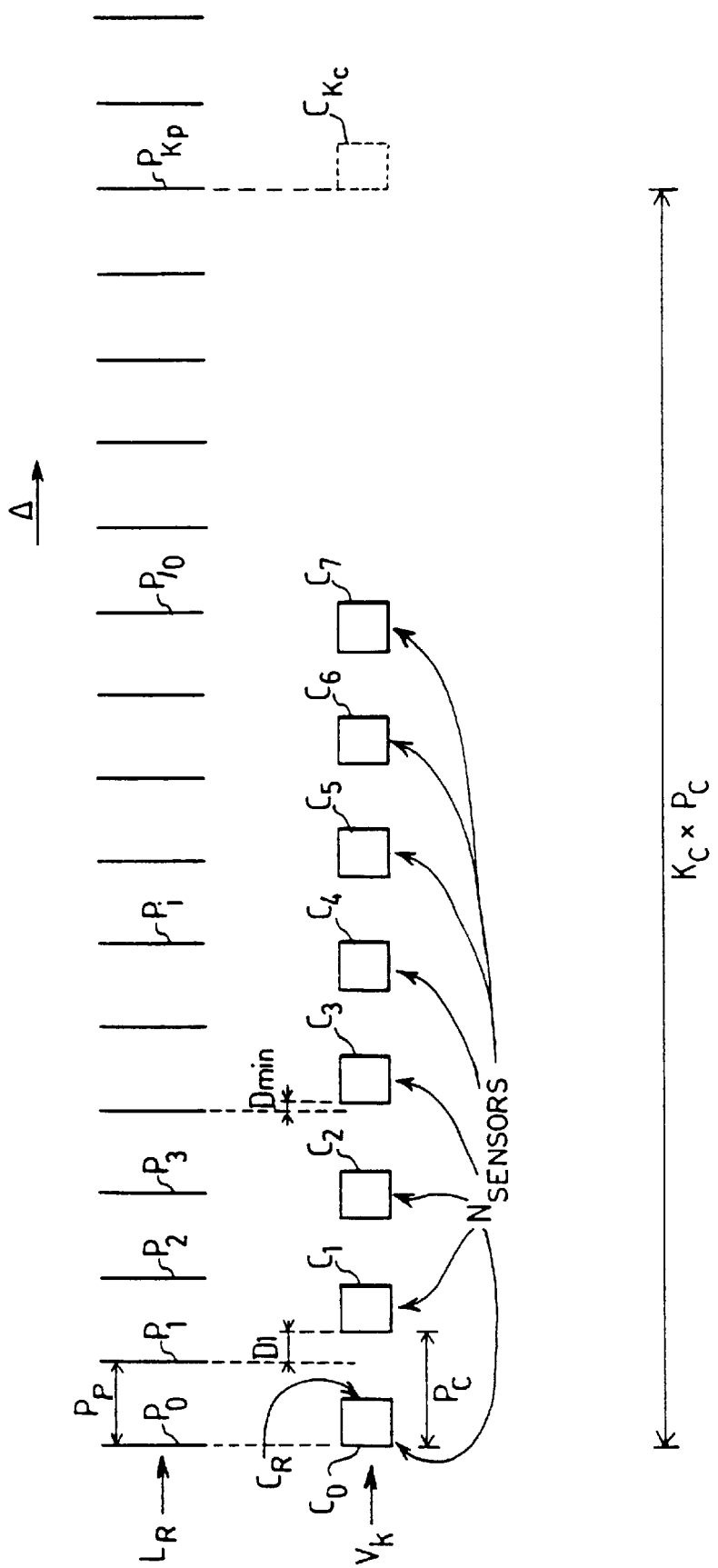
FIG. 1 shows a schematic view of a detection channel of an array according to the invention, positioned so as to be facing the edges of the first pixels of the image line formed out of said detection channel.

In the example of FIG. 1, the number $N_c$ of sensors of a detection channel of a detection array according to the invention, as shown schematically, is equal to 8. The other detection channels (not shown) extend in rows parallel to that shown, so as to cover a height or width of image according to the image scanning mode, and they include one and the same useful number of sensors. The sensors $C_i$ of the channel shown, referenced $C_0$ to $C_7$ are approximately square-shaped, with a side equal for example to 25 $\mu$m, and are aligned in the scanning direction $\Delta$, which may be horizontal or vertical, with a spatial pitch designated by $p_c$. A detection array of this kind is, for example, known from the published patent application FR-2 692 423 filed on behalf of the present Applicant. The figure also shows respective positions $P_i$, i varying generally from 0 to J (J being equal, in the known examples, to about 760), corresponding to the edges of the pixels of the image line $L_k$ analyzed by the detection channel $V_k$, k varying generally from 0 to M (M being equal to 1024 in the known example). The spatial pitch of the pixels is designated by $p_p$. The final image which comprises J times M pixels complies with a predetermined standard.

The pixels of one and the same image line $L_k$ are formed out of the sampling signals delivered by the sensors during the scanning, as a function of the illumination that they receive from one and the same successively analyzed elementary field. These signals are first of all injected, integrated and then read to be totalized sequentially by a TDI type processing in the focal plane of the array. They are then shaped to form a video signal compatible with the television standard used, especially with the pixel pitch used.

In order to enable direct comparison between the position of the elementary sensors of the array and those of the pixels of the final image obtained, the line of pixels $L_k$ has been shown in the figure in such a way that the positions $P_i$ of the pixels of this line are positioned in parallel and facing the detection channel $V_k$. The position $P_0$ of the first pixel coincides spatially with a side $c_R$ of the first sensor $C_0$ used as a reference sensor at a given instant of reference. This instant of reference corresponds to the end of the time of exposure of the sensor $C_0$ for one of the elementary fields of view respectively analyzed by the detection channel $V_k$ studied.

According to the invention, the sensor pitch $p_c$ is differentiated from the pixel pitch $p_p$ by a value equal to a fraction of the pixel pitch so that the sensor-pixel coincidence, which is achieved for the reference sensor $C_0$, is no longer synchronous for any other sensor exposed to the same elementary field of view.

The information elements coming from the different sensors then form phase-shifted cycles of analysis. This phase-shift, with a period greater than that of the processing of the sensors of one and the same detection channel, enables a sequential reading on a single bus. This reading is regulated so as to be in phase with the end of the injection-integration cycle of the detection channel considered corresponding to one and the same elementary field of voew, so much so that no buffer memory is then required.

In a more detailed way, the sensor and pixel values, respectively referenced $p_c$ and $p_p$, are such that there is a common pitch of spatial-temporal coincidence $P_{st}$ between the two series of elements. In other words, there are two whole numbers of sensors and pixels, respectively $K_c$ and $K_p$ each greater than or equal to one, that verify the relationship:

$$P_{si} = K_p p_p = K_c p_c \qquad 5$$

The condition of non-coincidence makes it necessary for the number $N_c$ of sensors implemented per detection channel to remain smaller than $K_c$, $K_c$ actually corresponding to the fictitious number of sensors for which there is periodic coincidence of the injection-integration cycles. The spatial displacement $D_i$ between a sensor $C_i$, different from the reference sensor, and the reference position $P_i$ of the closest pixel to be sampled is therefore never zero. For example, the displacement $D_1$ for the first sensor $C_1$ is directly equal to the difference between the values of the pitches $p_p$ and $p_c$.

The displacement $D_i$ may, more specifically, be quantified simply from the values of pitch $p_p$ and $p_c$ and from the minimum displacement, referenced $D_{min}$, obtained for one of the sensors of one and the same detection channel. A simple computation shows that the value of the minimum displacement is equal, as a function of the previous parameters, to:

$$D_{min} = \frac{p_c}{K_p} = \frac{p_p}{K_c} \qquad (1)$$

The sensors $C_i$ can be classified according to the rising integer value of their displacement with respect to the closest pixel as obtained after standardization by the minimum value $D_{min}$. For example, in this classification, the rank $U_1$ of the first sensor $C_1$ is equal to:

$$U_1 = \frac{(D_1)}{D_{min}} \quad \text{(relationship 2)}$$

or again:

$$U_1 = \frac{(p_p - p_c)}{D_{min}}$$

(it being known that $D_1 = p_p - p_c$)

According to the invention, this classification determines the order of reading of the different injection-integration cycles of the different sensors of one and the same detection channel, in thus defining a distribution of the integration cycles.

This order may be determined more generally by the successive values of the terms $U_i$ of an arithmetical progression that is successively "reset" (that is, translated by an amplitude equal to a whole number of times $K_c$, i.e. in mathematical terminology "modulo $K_c$") with respect to the values of "i" corresponding to the $N_c$ sensors actually used per detection channel, i being the number of the sensor in the rising order of numbering with respect to neighborhood (such as that shown in FIG. 1). The progression thus has a first term $U_0$ that is zero (corresponding to the reference sensor $C_0$) and a common difference "r" such that:

$$U_i = i \cdot r \ [\text{modulo } K_c]$$

The common difference "r" of this progression may be determined simply by fictitiously assuming a case where the common difference is equal to $U_1 r$, the first sensor $C_1$ then having the rank 1. Thus, the previous relationship can be written as follows:

$$1 = U_1 \cdot r \ [\text{modulo } K_c]$$

giving $$r = \frac{(nK_c + 1)}{U_1}$$

n being an adapted integer or $$r = \frac{(nK_c + 1)D_{min}}{D_1}$$

(according to the relationship (2))

Furthermore, if the reference taken is the reading distance $D_1$, corresponding to the distance travelled by the image scanned during the transfer of data from a sensor to a summation circuit, the condition of non-coincidence of the injection-integration cycles may be expressed by the bracket of values to which the value of the sensor pitch $p_c$ must belong. This value is indeed such that the minimum distance $D_{min}$ is firstly greater than the distance $D_1$ needed for the transfer of data and secondly smaller than the maximum displacement corresponding to the distance travelled between the instant of the end of exposure of the last-ranking sensor and the instant (reference instant) of the reference sensor. This twofold limitation is expressed by the following dual inequality:

$$D_I < D_{min} < \frac{(p_p - D_I)}{(N_c - 1)} \qquad (3)$$

In practice, the pixel pitch defined by $p_p$ in the scanning direction and by the number of lines in the direction orthogonal to the scanning is set by the television standard. The number of sensors $N_c$ is laid down by the sensitivity desired per detection channel and the sensor pitch $p_c$ is limited by the technology used which sets its minimum value.

In order to limit the amount of space occupied by each detection channel, it is appropriate to choose the order of reading of the summation circuits for the shaping, by accumulation of the charges, of the luminance signal intended for each pixel. It is thus advantageous to take the reading in the order going from the sensor with the highest rank to the sensor with the lower rank, as defined according to the arithmetical progression defined further above.

Thus, the number of summation stages of each module is at least equal to the number of sampling signals, hereinafter referenced $N_{ech}$. Indeed, the number of summation stages of the TDI processing module associated with each detection channel is then such that at least one summator is assigned to the processing of the luminance information of each of these sampling signals.

Now, the number of information elements to be processed in the focal plane of the array, for each detection channel and per read cycle, is determined by the number of sampling signals delivered by the first sensor in the order of the injection cycle and by the last sensor in this order, plus or minus one unit. A simple computation shows that the number of sampling signals and hence the minimum number of summation stages per detection channel $N_{tdi}$, is equal to:

$$N_{tdi} = N_{ech} = PE \left[ \frac{(n_c - 1)p_c}{p_p} \right] \text{ with } PE = \text{integer part}$$

A description is given here below of a first architecture of a detection array corresponding to the method of the invention for a single television standard and a single scanning mode. This example is chosen to be compatible with the international television standard known as the CCIR 625-line standard. This 4/3 format standard is designed to be used with a vertical image scanning type of camera.

Figure 2:
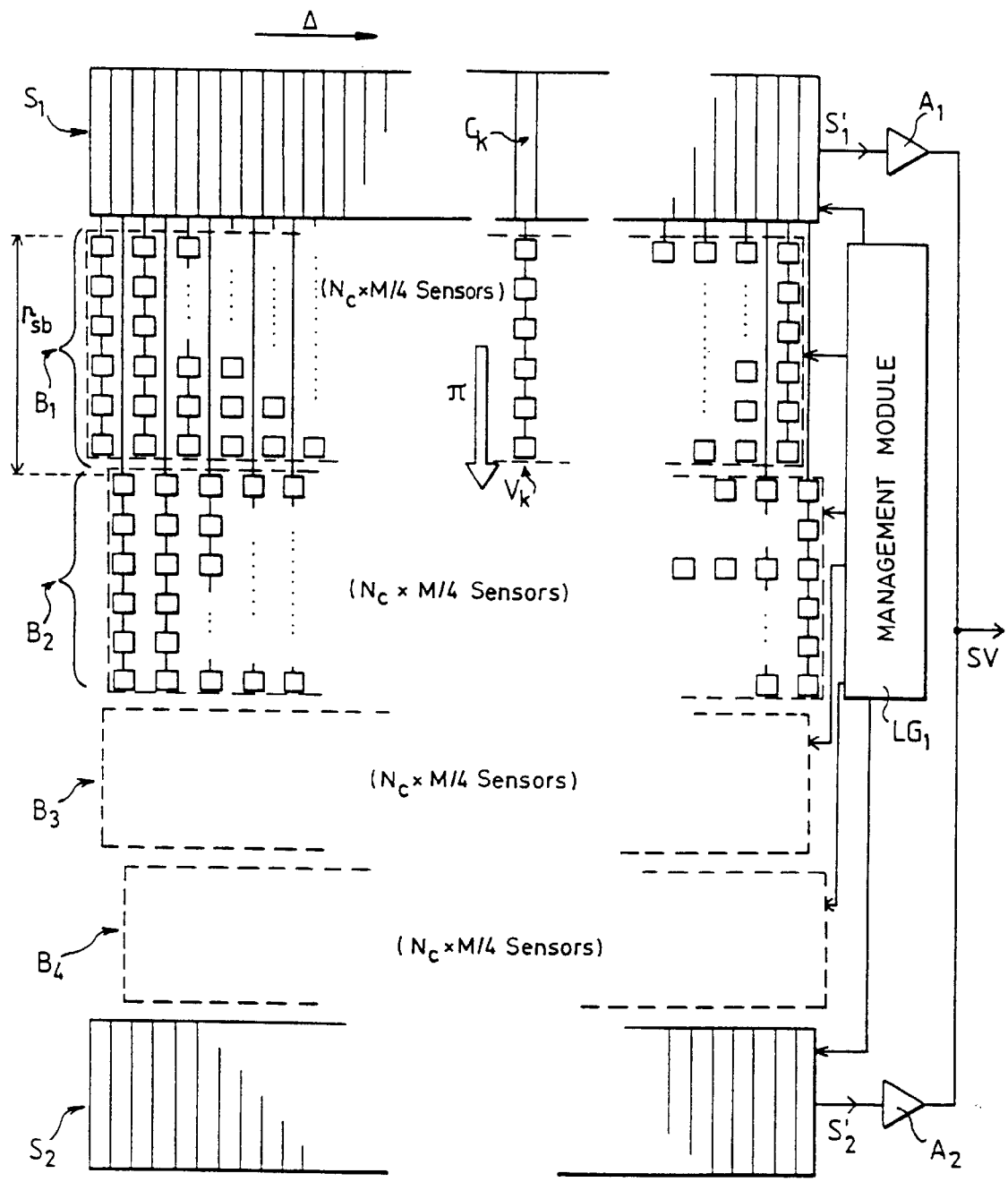
FIG. 2 shows a diagram of an array according to the invention for a vertical scanning camera adapted to the CCIR 625-line standard.

An example of a camera suited to this standard comprises an array of the type described in the published patent application FR-2 692 423 already cited. The basic diagram of such an array is shown partially in FIG. 2. It has M=1024 detection channels distributed in four sub-blocks B1 to B4, each channel $V_k$ for each sub-block (with k varying from 1 to 256) being formed by $N_c$=8 sensors aligned in the vertical direction π of the scanning and at a distance from each other that is equal to the sensor pitch $p_c$. Each sub-block is therefore formed by a matrix of $N_c$ lines for M/4 columns of sensors. In this schematically represented exemplary embodiment, the sensors are substantially square-shaped with a side approximately equal to 25 μm and the sensor pitch is taken to be equal to twice the length of a side of the sensor.

The sensors of one and the same channel $V_k$ are connected to one and the same cell $C_k$ of a summation shift register. A management logic module LG pilots the time parameters linked to the processing (namely the injection, integration and summation) of the charges delivered by the detection array and to the opto-mechanical scanning of this array.

In order to obtain a regular structure, the detection channels $V_k$ of each sub-block are distant from one another, in the horizontal direction Δ, by a pitch equal to the sensor pitch $p_c$, namely twice the length of a sensor side. The sub-blocks are juxtaposed and are subjected to a displacement from one another along this direction Δ by a distance equal to a half-length of a sensor so that the Shannon sampling relationship is met on the whole. For reasons of space requirement, the sub-blocks thus juxtaposed are grouped in twos, $B_1$ and $B_2$ on the one hand and $B_3$ and $B_4$ on the other hand, with a displacement equal to a sensor side length between each sub-block of each grouping. The two sub-blocks of one and the same grouping are then connected to one and the same shift register $S_1$ or $S_2$. output of the shift registers, the data elements $S'_1$ or $S'_2$ are mixed after amplification through the amplifiers $A_1$ and $A_2$ to give the output signal SV.

Thus, the optical image formed on the array by the opto-mechanical projection system has characteristics—in terms of dimensions (width Li, height Hi), number of useful lines per frame of an image Ni (an image being formed by two interleaved frames), frame period Tt, interline distance per frame (equal to the pixel pitch $p_p$)—whose exemplary values adapted to the CCIR 625 line standard are assembled in the following Table I:

TABLE I

| Li (μm) | Mi (μm) | Ni (μm) | Tt (ms) | $p_p$ (μm) |
|---------|---------|---------|---------|------------|
| 12 812  | 9 609   | 288     | 20      | 33,4       |

In practice, the linear scrolling efficiency of the image scanning mirror being for example 80%, the effective scanning efficiency $\rho_b$ is equal, as a function of the value of the height of the array Hb, to:

$$\rho_b = \frac{0,8\,Hi}{(Hi + Hb)}$$

Furthermore, in this example, the reading distance $D_1$ may be computed as a function of the other parameters according to the following elementary relationship, it being known that the sensor pitch used $P_{min}$ is as close as possible to the technological limit assumed for example to be equal to 45 μm and that the total reading time $T_l$ allocated to the transfer of the charges is equal to 3 μs:

$$D_l = \frac{T_l\,Ni\,p_{min}}{\rho_b\,Tt} \approx 3\,\mu m$$

In order to determine the optimum value of the sensor pitch and the corresponding common difference "r" that will condition the optimum order of triggering of the injection-integration cycles for the different sensors of one and the same detection channel, it is possible, in practice, to apply the following string of selections to each particular case:
  predetermined range of values of the fictitious length of the possible detection channel to be taken into consideration, which is expressed by a number of sensors $K^c$ corresponding to the period of coincidence between the positions of the sensors and of the pixels considered as being two infinite sequences;
  corresponding values of the reading distance $D_1$ taken as being equal to its upper limit, namely equal to the distance $D_{min}$ (according to the relationship (3)), these values being obtained from the relationship (1), $p_p$ and $K_c$ being known;
  corresponding values of the sensor pitch $p_c$, obtained from the relationship (1) and the values of $p_p$, $K_c$ and $K_p$ ($K_p$ having the first value greater than $K_c$ that gives $p_c$ a value greater than the minimum value $p_{min}$ taken in this example as being equal to 45 μm);
  values deduced from the rank $U_1$ of the first sensor from the relationship (2) (it being known that $D_1=p_p-p_c$) and the common difference "r" on the basis of the relationship (4).

In the context of this first exemplary embodiment, the different values of the characteristic parameters studied ($K_c$, $D_1$, $p_c$, $U_1$, r) determined according to the previous selection sequence are assembled in the following Table II:

TABLE II

| $K_c$ | $D_1$ (μm) | $p_c$ (μm) | $U_1$ | r |
|-------|------------|------------|-------|---|
| 9     | 3,713      | 48,27      | 4     | 7 |
| 10    | 3,342      | 46,78      | 4     | — |
| 11    | 3,038      | 45,57      | 4     | 3 |
| 12    | 3,785      | 47,34      | 5     | 5 |
| 13    | 2,57       | 46,27      | 5     | 8 |

Thus, for this exemplary embodiment, the most favorable case for which the sensor pitch $p_c$ most closely approaches the technologically dictated boundary (45 μm) is given by a number of fictitious sensors equal to 11 per detection channel and leads to the choice of a sensor pitch with an effective length of 45.6 μm (given a precision of 0.1 μm). Given that this latter value diverges slightly from the boundary value, compliance with the 4/3 format of the CCIR standard may still be obtained by adapting the number of sensors positioned in the direction Δ perpendicular to the vertical scanning direction π. This may lead to a very slight anamorphosis of the image that remains negligible as compared with the distortions and aberrations of the optical systems.

More generally, the dimensions of an array of this type are conditioned by those of the sub-blocks and of the pitch $p_{sb}$ of these sub-blocks in the direction π. The temporal phasing dictates a situation where their pitch is, firstly, greater than or equal to the height of a detection channel and, secondly, equal to an integral multiple ν of the line pitch $p_p$ of the final image. This is expressed by the following inequality:

$$p_c(N_c-1)+p_{min}<\nu p_p(=p_{sb})$$

The numerical application of this relationship to the foregoing example, with $p_c$=45.6 μm, $N_c$=8, $p_{min}$=45 μm, $p_p$=33.4 µm), gives the value of m equal to 11, hence the value of the sub-block pitch $p_{sb}$ and that of the height of the array Hb. The set of values of the spatial/temporal characteristics related to the array B of this exemplary embodiment $N_c$, $K_c$, $p_{sb}$, $p_c$, $N_{tdi}$, Hb, $\rho_b$, Ti (integration cycle period), Vb (scanning speed) and $T_l$ are assembled in the following Table III which also gives, by way of comparison, the values of these same characteristics obtained with an equivalent prior art array $B_0$ possessing a sensor pitch equal to a integral multiple of the pixel pitch (given the minimum value of the sensor pitch, 45 µm, and that of the pixel pitch, 33.4 µm, the sensor pitch is taken to be twice the pixel pitch):

channel $N_{tdi}$ respectively for a detector of the type B according to the invention and for a conventional detector $B_0$ in the event of a magnification equal to 2 and a pixel pitch of 16.7 µm:

TABLE IV

|  | $p_c$ (µm) | $p_p$ (µm) | $N_{tdi}$ |
|---|---|---|---|
| B | 45,6 | 16,7 | 20 |
| $B_0$ | 66,5 | 16,7 | 32 |

TABLE III

|  | $N_c$ | $K_c$ | $P_{bs}$ (µm) | $P_c$ (µm) | $N_{tdi}$ | $P_b$ % | $T_i$ (µs) | $V_b$ (m/s) | $T_1$ (µs) |
|---|---|---|---|---|---|---|---|---|---|
| B | 8 | 11 | 367,6 | 45,6 | 10 | 69,5 | 48,3 | 0,692 | 4,39 |
| $B_0$ | 8 | — | 534,7 | 66,8 | 16 | 65,6 | 45,6 | 0,682 | 5,7 |

It can be seen especially from this table that the detection by optimized distribution of the integration cycles, obtained by the implementation of a sensor pitch with a length greater than the pixel pitch (with a difference equal to a fraction of this pitch) enables a reduction of nearly 40% (16 to 10) in the number of summation stages in the focal plane. This reduction entails a major reduction of the total surface area of the reading circuit formed by the transfer and summation circuits and hence a saving of dissipated power. Furthermore, it must be noted that there is a substantial improvement (of more than 3%) in the signal-to-noise ratio measured from the values of the scanning efficiency values (or an improvement of range of about 10% for equal resolution).

It may also be desirable to increase the resolution of the image in the scanning direction, namely to obtain magnification in this direction. This increase in resolution is achieved conventionally by a so-called sub-scanning mode. During a frame period, only one part of the image is scanned and the scanning speed is reduced proportionally.

With a standard detector, and owing to the necessary synchronism between the pixel pitch and the sensor pitch, this function can be achieved only when the ratio between the sensor pitch and the pixel pitch of the detector is equal, in normal scanning mode, to an integral multiple of the magnification desired. For a detector according to the invention, the sensor pitch is "decorrelated" from the desired value of magnification. The consequence of a change in image magnification relates only to the order of reading of the sensors, of which the basic parameters of the reading order arithmetical series $U_{1g}$ for the first sensor and the common difference "$r_g$" are equal, as a function of the pixel pitch $p_{pg}$ corresponding to the desired magnification g, to:

$$U_{1g} = \frac{(p_c - P_{pg})}{D_I}$$

and $$r_g = \frac{(nK_c + 1)}{U_{1g}}$$

For example, by using an array of the type described here above and by applying a magnification factor equal to 2, the basic parameters of the reading order arithmetic series are equal to $U_1$=19 and r=7. The following Table IV assembles the sensor pitch values $p_c$ and the number of summators per In sub-scanning mode, the method according to the invention has increased value owing to the increasing difference in the number of summators required for the TDI function when the desired magnification also increases. Furthermore, the computation of the scanning efficiency values as a function of the magnification shows, with a conventional detector, a decrease proportional to the magnification due to the growth of the sensor pitch whereas it remains almost constant with a detector implementing the method according to the invention.

The optimization of the performance characteristics obtained by the method according to the invention may also be used to achieve the compatibility, in the case of a vertical scanning detection array, of the implementation of several television standards. The method consists in searching for the optimum value, namely the value closest to the technologically possible value, of the sensor pitch common to all the standards in question and then in deducing the values of the reading order characteristics corresponding to each of these standards. Such values may be obtained by preparing tables of the Table II type corresponding to the CCIR standard. For example, a search for an optimum sensor pitch for the US 525-line standard using an array, as described here above, for the implementation of the invention may take the form of the Table V here below:

TABLE V

| $K_c$ | $D_1$ (µm) | $p_c$ (µm) | $U_1$ | r |
|---|---|---|---|---|
| 9 | 4,403 | 40,48 | 2 | 5 |
| 10 | 3,962 | 47,55 | 2 | — |
| 11 | 3,6 | 46,83 | 2 | 6 |
| 12 | 3,3 | 46,23 | 2 | — |
| 13 | 3,048 | 45,72 | 2 | 7 |
| 14 | 2,83 | 45,285 | 2 | — |
| 15 | 2,64 | 44,91 | 2 | 9 |

By comparing Tables II and V, the compatibility between the CCIR 625 line standard and the US 525 line standard may be obtained by taking a common optimum sensor pitch value equal to 45.6 µm. The determining of the pitch of the sub-blocks $P_{sb}$ is done by determining the least common multiple of the line pitch values of each of the standards greater than the height of a detection channel. This determining is obtained from the value of the integral factor κ such that:

$$P_{sb} = \kappa P_{sb}(CCIR) \frac{p_p(US)}{p_p(CCIR)} \approx 435{,}875 \, \mu m$$

A matching of this kind gives rise to an imperceptible anamorphosis in the final result. The following Table VI brings together the selections of the values of the different parameters for each of the standards on the basis of a common implementation achieved with an array according to the invention, taking a sensor pitch equal to 45.6 $\mu$m, a sub-block pitch equal to 435.875 $\mu$m and a scanning efficiency of 68.3%:

TABLE VI

| Standard | $p_p$ ($\mu$m) | $N_c$ | $K_c$ | $N_{tdi}$ | $T_i$ ($\mu$s) | $V_b$ (m/s) | $T_1$ ($\mu$s) |
|---|---|---|---|---|---|---|---|
| CCIR | 33,42 | 288 | 8 | 10 | 47,4 | 0,709 | 4,31 |
| US | 39,625 | 243 | 13 | 8 | 46,8 | 0,882 | 3,6 |

The description of the implementation of a detector made according to the method of the invention is supplemented hereinafter with the description of an exemplary control management circuit integrated into the focal plane of the camera and made preferably by CMOS technology. This management circuit has a set of logic circuits to carry out a distributed sequential reading of the elementary sensors and to enable multiple mode operation of the detector suited to different scanning modes and to different standards.

According to what has been stated here above, the reduction of the sensor pitch of one and the same detection channel, according to the method of the invention, dictates a single-valued relationship between the order of reading of the sensors and the choice of a mode of operation (scanning, standard). This relationship then gives rise to a structural arrangement capable of managing all the timing diagrams pertaining to the cycles for the transfer of information (integration, summation, reading and reinitialization) and the shaping of the video signal.

Figure 3:
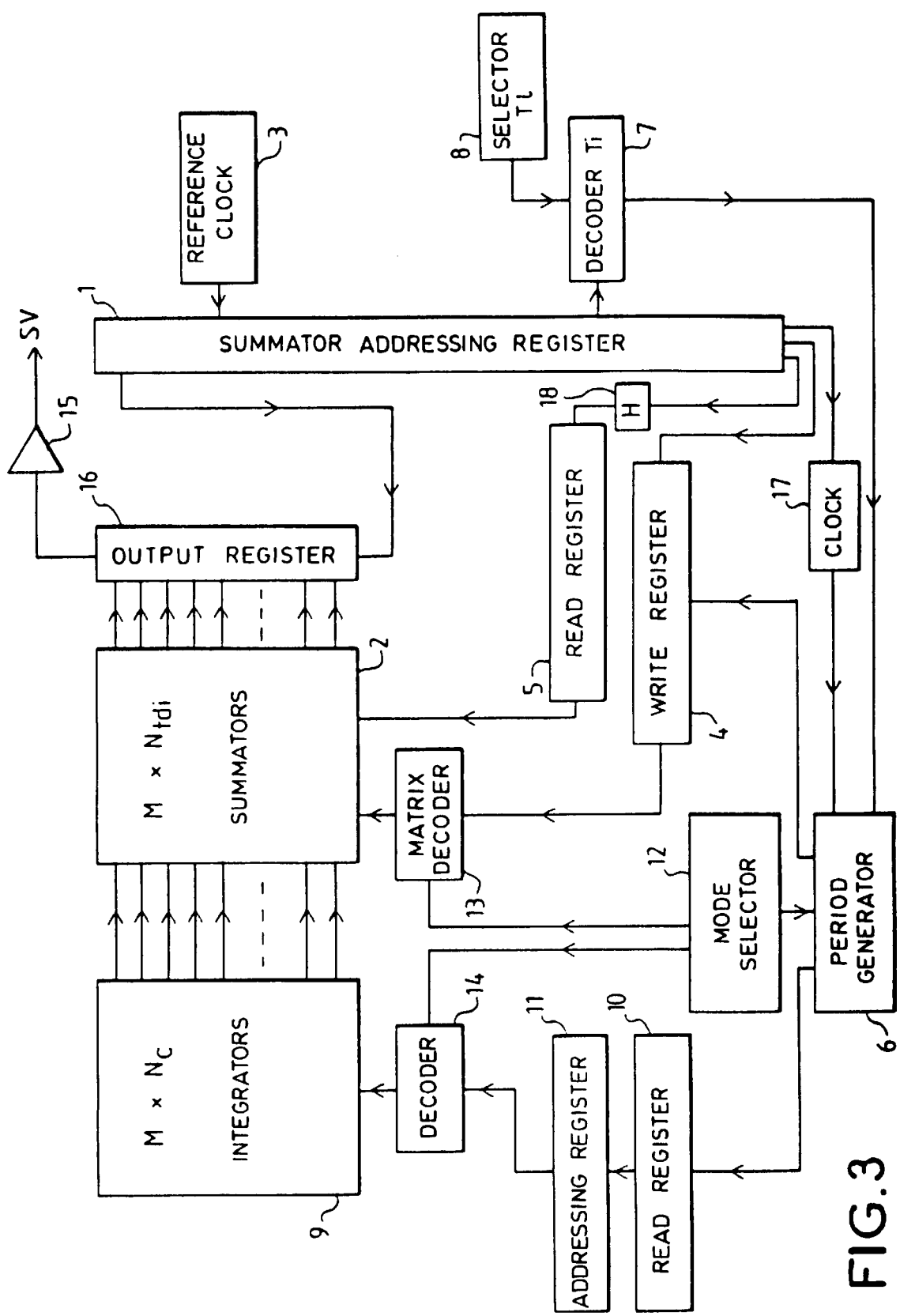
FIG. 3 exemplifies a management circuit for the implementation of the detection method using integration and distributed reading cycles according to the invention.

FIG. 3 illustrates an exemplary embodiment of a management circuit of this kind integrated into the focal plane of the detector. In this example, the temporal references- are given by a shift register 1. The temporal resolution of this register 1 is given by the half-period of a reference clock 3 or again by the ratio between the duration of an integration cycle $T_i$ of the charges defining a pixel sampling signal and the number of bits of the register.

The register 1 is coupled to the write register 4 and the read register 5 for the writing in and reading of the TDI summator registers 2 and to a generator 6 of integration cycle periods $T_i$ by means of a decoder 7 piloted by a selector 8 of reading time by transfer $T_l$ ($T_l$ includes the integration period $T_i$ and the time allocated to reinitialization). The integration period generator 6 pilots the summation registers 2 and the integrators 9 of the charges delivered by the sensors respectively through the write register 4 for the summation register 2 and a reading and reinitialization shift register 10 coupled to a demultiplexer register 11 for the integrators 9.

The management circuit also has a mode selector 12 (scanning, standard) coupled to the integration period generator 6 and activates decoders 13 and 14 applied at output, respectively, of the write register 4 and of the demultiplexer register 11.

Thus, the five registers 1, 10, 11, 4 and 5 give an example of a basic structure for the management of the timing diagrams of the information transfer cycles relating to the integration, summation, reading and reinitialization of the sampling signals coming from the sensors so as to shape a video signal, in the course of time, that is compatible with a given mode of scanning and a given standard.

The first register 1 is dedicated more specifically to the sequential addressing of the summator registers 2 that have reached the end of a cycle of analysis and to the shaping of the video signal SV after amplification at 15 by activation of the output register 16. The first register 1 is sized so as to be capable of incrementing the pulses needed for the other registers 10, 11, 4 and 5 according to the operating diagram given in detail here below.

The shift register 10 has a number of cells sufficient to achieve the cover of a complete cycle for the reading and reinitialization of the set of M.$N_c$ integrators 9 corresponding to the $N_c$ sensors distributed on M detection channels. This second register generates the instants for the reading and reinitializing of each of the integrators 9, these instants being governed by the generator of integration periods 6 piloted by the first register 1 through a synchronization clock 17.

The commands coming from the second register 10 are demultiplexed by the third register 11 associated with the decoder 14 to be applied in the order defined by the mode of operation, such as those illustrated in the above examples, to the different integrators 9.

The fourth register 4 makes it possible, in association with the decoding matrix 13, to address each of the $N_{tdi}$ summators of each of the M detection channels at the collection of the sampling signals delivered by the sensors of one and the same channel and assigned to the shaping of one and the same pixel. The number $N_{tdi}$ of summators activated per detection channel and defined by the mode selector 12 depends on the mode of operation as illustrated in the above examples.

Finally, the fifth register 5, incremented by a pulse coming from the last bits of the first register, successively selects the summators 2 at the end of the pixel formation cycle and permits their sequential reading to prepare the video signal SV. It then increments their reinitialization and assigns them to the processing of the sampling signals pertaining to each new pixel.

Figure 4:
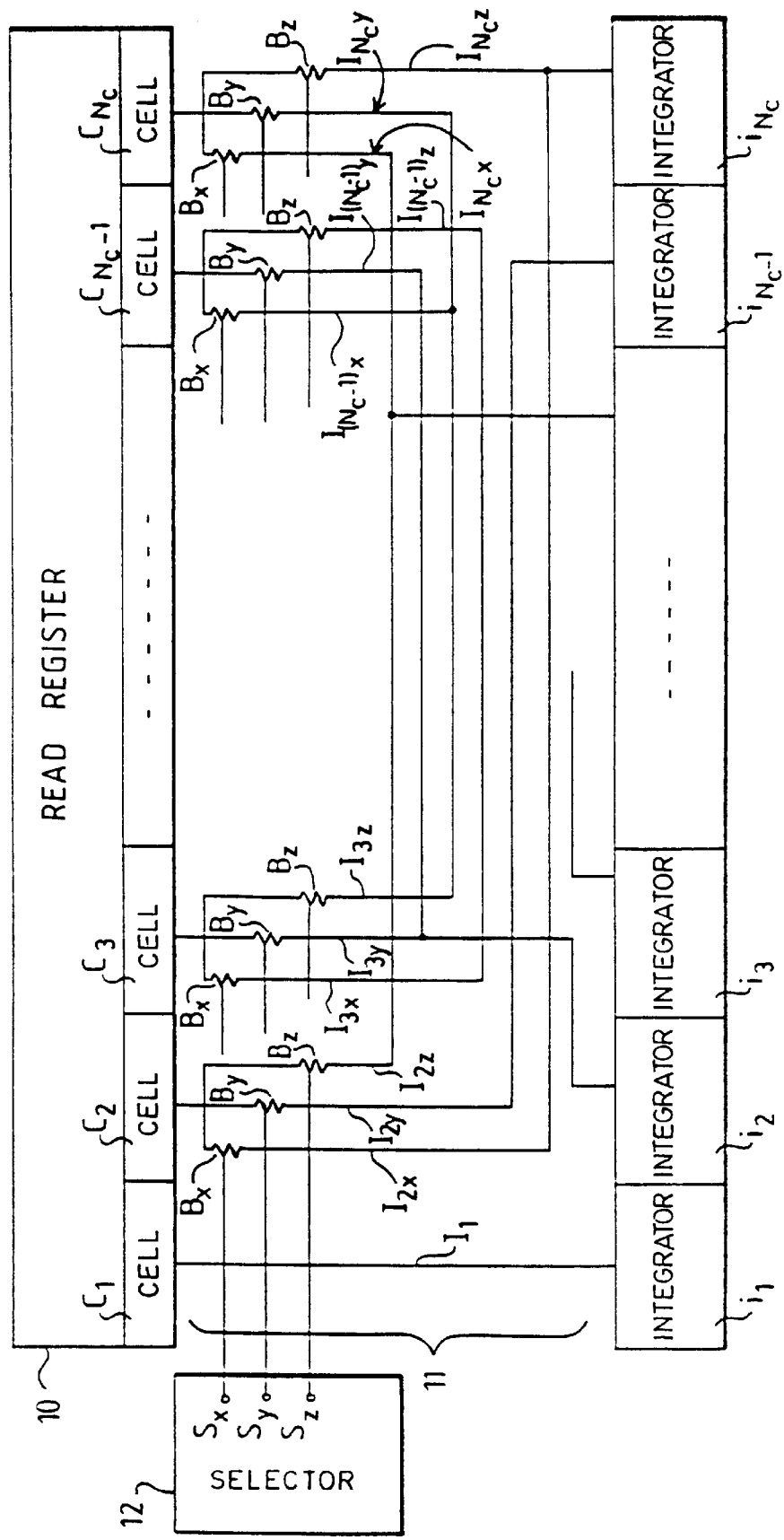
FIG. 4 exemplifies a register for the addressing of the register used to read the charges that are delivered by the sensors of a detection channel and then integrated, the standard number that can be selected being equal to three.

FIG. 4 provides a more precise illustration of an exemplary addressing register 11 and register 10 for reading the charges that are delivered by the $N_c$ sensors of a detection channel during an exposure period and then integrated when the number of standards capable of being selected is, as a non-restrictive example, equal to three. The reading and reinitializing register 10 is a shift register also comprising $N_c$ stages that may be totally or partially used. The charges injected by the injection circuits into the integrators $i_1, i_2, \ldots, i_{Nc-1}, i_{Nc}$, are expressed in terms of voltage level in the cells $C_1, C_2, \ldots, C_{Nc-1}, C_{Nc}$ by means of transfer links $I_1$, $I_{2x}, I_{2y}, I_{2z}, I_{3x}, I_{3y}, I_{3z}, \ldots, I_{(Nc-1)x}, I_{(Nc-1)y}, I_{(Nc-1)z}, I_{(Nc)x}, I_{(Nc)y}, I_{(Nc)z}$. The choice between these links is defined by the choice of a standard $S_x$, $S_y$ or $S_z$ selected from the selector 12. The selection of $S_x$, $S_y$ or $S_z$ is expressed by the series activation of one of the three coils, respectively $B_x$, $B_y$ or $B_z$ positioned on each of the three links that connect each of the cells of the shift register 10 to the integrator whose reading rank corresponds, for the selected standard, to the number of the cell of the link considered. The set of these links $I_1$ to $I_{(NC)z}$ forms the addressing register 11.

What is claimed is:

1. A method of detection with distributed integration and read cycles for a camera that scans in a given direction $\Delta$, $\pi$ designed to form an image made up of pixels spaced out at a pitch $p_p$ with a value corresponding to a predetermined standard, said camera comprising an array of several rows of elementary sensors $C_i$ positioned in a direction orthogonal to the scanning direction, the sensors that belong to different rows and are aligned in the scanning direction defining a TDI detection channel $V_k$, each detection channel $V_k$ comprising a circuit for the injection and integration of the charges delivered by each sensor $C_i$ during a period of exposure to form a sampling signal, and a read circuit of summators to totalize the sampling signals corresponding to one and the same pixel, said method consisting of the choosing of a value of spatial pitch $p_c$ for the sensors of one and the same detection channel that differs from the value of the pixel pitch $p_p$ by a fraction of this pixel pitch such that a sensor-pixel coincidence, which is achieved for a reference sensor $C_0$, is no longer synchronous for any other sensor exposed to the same elementary field of view and consisting of the recording, in each summator, between two successive readings of each sensor, of the information coming from the associated integrated circuit.

2. A detection method according to claim 1, wherein the sensor-pixel asynchronism implies that the number $N_c$ of sensors put into use per detection channel remains smaller than $K_c$, with $K_c$ corresponding to a fictitious number of sensors for which there is periodic coincidence of the integration-injection cycles, a sensor $C_i$ different from the reference sensor $C_0$ thus having a spatial displacement $D_i$ of position that is never zero, as referenced with respect to a position $P_i$ of the closest pixel to be sampled.

3. A method according to claim 2, wherein the sensors $C_i$ are classified in an order that is a function of the rising value of their displacement with respect to the closest pixel, obtained after standardization by a minimum value of displacement $D_{min}$, wherein this classification defines the order of reading of the different cycles of injection-integration of the different sensors of one and the same detection channel, defining a distribution of the integration cycles, this order being determined by the successive values of the terms $U_i$ of an arithmetical progression with a common difference r such that:

$$U_i = i \cdot r \; [\text{modulo } K_c]$$

4. A method according to claim 3, wherein the common difference r is determined as a function of the displacement $D_i$ of the first sensor $C_1$ by the relationship:

$$r = \frac{(nK_c + 1)D_{min}}{D_1}$$

5. A method according to claim 4, wherein the value of the sensor pitch $p_c$ is such that the minimum distance $D_{min}$, firstly, is limited by a space $D_1$ corresponding to a reading that is in progress and, secondly, is smaller than the maximum displacement.

6. A method according to claim 3, wherein the order of reading of the summation circuits for the formation, by accumulation of the charges, of the luminance signal designed for each pixel, starts with the reading of the sensor of the highest possible rank defined according to the geometrical progression $U_i$.

7. A method according to claim 6, wherein the number of sampling signals assigned to the formation of a pixel, equal to the minimum number of summation stages per detection channel, is equal to the integral part of the quantity $(N_c-1) p_c/p_p$.

8. A detection array for the implementation of the method according to any of the foregoing claims, comprising several rows of sensors to cover an image height of a scene projected and scanned by the array, each row constituting a detection channel $V_k$ comprising one and the same useful number $N_c$ of sensors $C_i$ aligned in a scanning direction $\Delta$ with a spatial pitch $p_c$, each detection channel $V_k$ being designed to form pixels of an image line $L_k$ on the basis of the sampling signals delivered by the sensors during the scanning, these signals being first of all injected, integrated and then read to be totalized sequentially by TDI type processing circuits in the focal plane of the array and finally shaped in a management circuit to constitute a video signal compatible with a determined pixel pitch standard, wherein the sensor pitch $p_c$ is differentiated from the pixel pitch $p_p$ by a value equal to a fraction of this pixel pitch so that a sensor-pixel coincidence is synchronous only for a reference sensor $C_0$ and for a fictitious sensor corresponding to a fictitious number $K_c$ of sensors per detection channel greater than the useful number and defining a pitch of spatial/temporal coincidence $P_{st}$ between the sensors and the pixels such that:

$$P_{st} = K_p p_p = K_c p c \; (K_p \text{ and } K_c \text{ being two integers}).$$

9. An array according to claim 8, used for a vertical scanning camera, wherein the detection channels are distributed into four sub-blocks, each channel $V_k$ of each sub-block being constituted by sensors aligned in the vertical direction $\pi$ of the scanning and being distant from one another by the sensor pitch $p_c$ taken as being equal to approximately twice the length of a sensor side, wherein the sensors of one and the same channel $V_k$ are connected to one and the same cell $C_k$ of a summation register, wherein a management logic module LG pilots the temporal parameters related to the processing of the charges delivered by the detection array, wherein the detection channels $V_k$ of each sub-block are at a distance from one another in the horizontal direction $\Delta$ by a pitch equal to the sensor pitch $p_c$, wherein the sub-blocks are subjected to a displacement with respect to one another along this direction $\Delta$ by a distance equal to a half-length of a sensor for reasons of space requirement and are grouped together in sets of two, with a displacement equal to a sensor side length, each of the successive detection channels $V_k$, $V_{k+1}$ of the two sub-blocks of one and the same grouping being then capable of being connected alternately to one and the same shift register and wherein the value of the sensor pitch $p_c$ is given by the relationship $k_p p_p = k_c p_c$ in giving $k_p$ the first value greater than $k_c$ that gives $p_c$ a value greater than the minimum value $p_{min}$ given by the technology used.

10. A method according to claim 7, applied to the modulation of scanning for an increase in image resolution in the scanning direction by the scanning of a part of the image and the proportional reduction of the scanning speed, corresponding to a magnification in this direction, wherein the order of the reading of the sensors is chosen as a function of the value of the magnification g desired, the basic parameters of the corresponding reading order arithmetic series $U_{1g}$ for the first sensor and the common difference "$r_g$" are equal, as a function of the pixel pitch $p_{pg}$ corresponding to the desired magnification g, to:

$$U_{1g} = \frac{(p_c - p_{pg})}{D_I}$$

and $$r_g = \frac{(nK_c + 1)}{U_{1g}}.$$

11. A method according to claim 7, applied to a multi-standard use, consisting in making a search for the value common to several standards of the optimum sensor pitch of a vertical scanning array and then in deducing the values of the characteristics $U_1$ and r in order to define each of the arithmetical progression series making it possible to establish the order of reading of the sensors corresponding to each of these standards.

12. An array of the type with sub-blocks according to claim 9, wherein the determining of the pitch of the sub-blocks $P_{sb}$ is done by determining the first one of the common multiples of the line pitches of each of the standards greater than the height of a detection channel, on the basis of the integer factor κ such that:

$$P_{sb} = \kappa P_{sb}(CCIR) \frac{p_p(US)}{p_p(CCIR)} \approx 435{,}875 \, \mu m$$

and wherein the values of the different characteristic parameters for each of the standards, such as the pixel pitch, the number $N_c$ of sensors per detection channel, the number $N_{dti}$ of summation stages per detection channel, the charge integration time $T_i$ and overall charge transfer time $T_t$ and the scanning speed $V_b$ for each of the standards are selected on the basis of the common values of the sensor pitch $p_c$ and of the sub-block pitch $P_{sb}$.

13. A management circuit integrated into the focal plane of the detection array according to claim 8, comprising a first register coupled to registers for the writing in and reading of the registers of TDI summators and a generator of integration cycle periods by means of a decoder piloted by a selector of reading time by transfer $T_t$ wherein the integration period generator pilots the summation registers and the integrators of the charges delivered by the sensors through, respectively, the write register for the summation register and a read and reinitialization register coupled to a demultiplexer register for the inrtegrators.

14. A management circuit according to claim 13, further comprising a scanning and standard mode selector coupled to the integration period generator, this selector activating decoders applied to the output, respectively, of the write register and of the demultiplexer register.

15. A management circuit according to claim 14, wherein the first, second, third, fourth and fifth registers form a basic structure for the management of the information transfer cycles relating to the integration, summation, reading and initialization of the sampling signals coming from the sensors in order to deliver, in the course of time, a video signal compatible with a given scanning mode and a given standard, wherein the first register is a shift register dedicated to the sequential addressing of the registers of summators that have reached the end of their cycle of analysis and to the formation of the video signal SV by activation of the output register and is sized to increment the pulses needed for the other registers, wherein the second register is also a shift register enabling the covering of an entire cycle for the reading and reinitialization of all the integrators by the adjustment of the instants of reading and reinitialization by the integration period generator piloted by the first register, the commands coming from the second register being demultiplexed by the third register associated with the decoder to be applied in the order defined by the mode of operation to the different integrators, wherein the fourth register makes it possible, in association with the decoding matrix, to address each of the $N_{tdi}$ summators of each of the detection channels at the collection of the sampling signals delivered by the sensors of one and the same channel and assigned to the formation of one and the same pixel, the number $N_{tdi}$ of summators activated per detection channel being defined by the mode selector and wherein the fifth register incremented by the first register succesively selects the summators at the end of the pixel formation cycle, authorizes their sequential reading for the preparation of the video signal and increments their reinitialization and then assigns them to the processing of the sampling signals pertaining to each new pixel.

16. A register for the reading and reinitialization of the management circuit according to claim 15, comprising a number of stages equal to the number of sensors per channel $N_c$ capable of being totally or partially used, wherein the charges injected by the injection circuits into the integrators are expressed in terms of voltage level in the cells by means of transfer links forming the addressing register, wherein the choice between the links is defined by the choice of a standard selected through the selector, the selection of the standard resulting in the series activation of one of the coils positioned on each of the links that connect each of the cells of the shift register to the integrator whose reading rank corresponds, for the selected standard, to the number of the link considered.

* * * * *